Aug. 3, 1965          D. L. VAN OSTROM          3,198,280
              VEHICLE SPEED CONTROLLING SYSTEM
Filed April 17, 1963                        3 Sheets-Sheet 1

INVENTOR.
David L. Van Ostrom
BY
O.D. McGraw
His Attorney

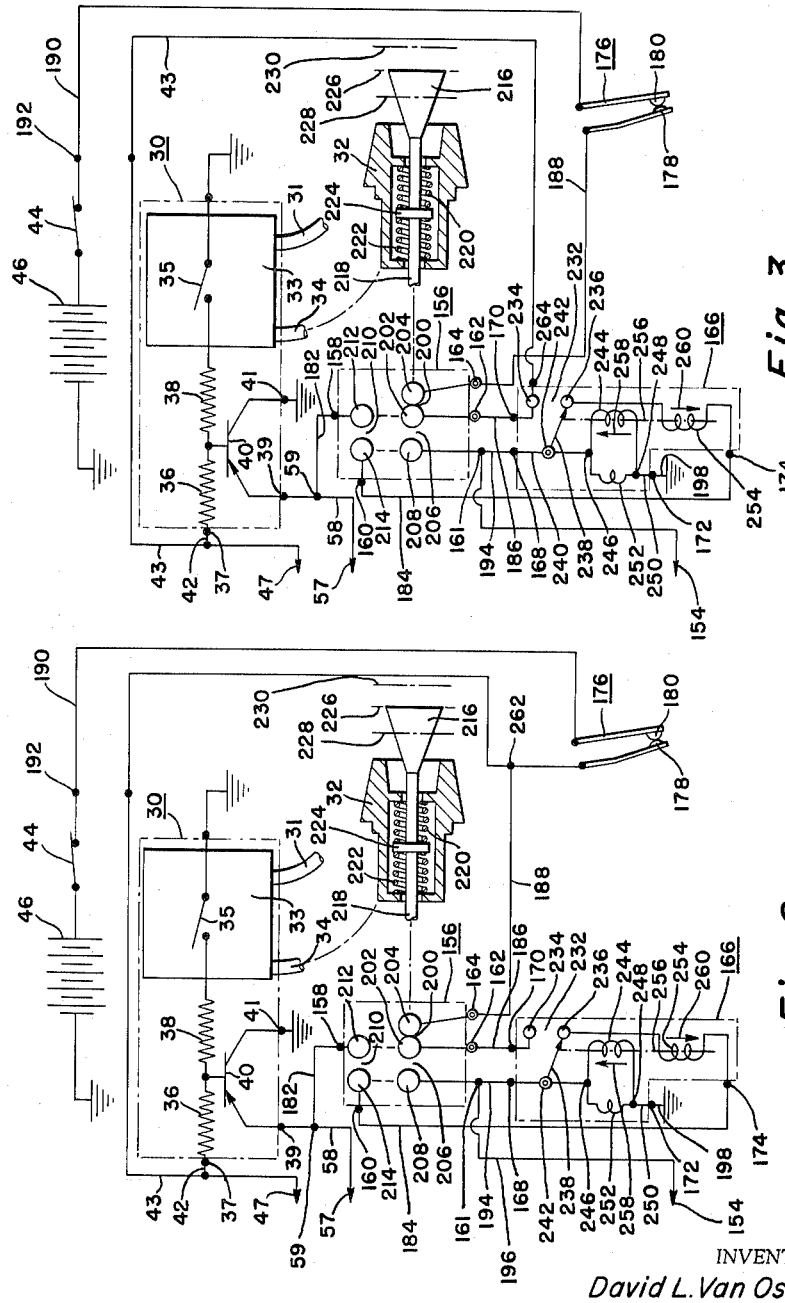

INVENTOR.
David L. Van Ostrom
BY
D. D. McGrew
His Attorney 3,198,280
VEHICLE SPEED CONTROLLING SYSTEM
David L. Van Ostrom, Flint, Mich., assignor to General Motors Corporation, Detroit, Mich., a corporation of Delaware
Filed Apr. 17, 1963, Ser. No. 273,667
9 Claims. (Cl. 180—82.1)

The invention relates to a vehicle speed sensing and controlling system and more particularly to such a system which is powered by fluid pressure such as the vehicle engine intake manifold vacuum and is electrically controlled to provide fast positive reaction in all facets of system operation. A system in which the invention is incorporated may have a speed warning function which will warn the vehicle operator of the attainment of a desired vehicle speed and may selectively be conditioned to maintain the desired vehicle speed under varying road load conditions. In some instances it is desirable to utilize a simplified system embodying the invention wherein the speed maintaining feature is utilized without the speed warning feature. In all modifications of the system control is obtained quickly and positively. This is preferably accomplished by utilizing electrical circuitry and electrically actuated mechanism which change the condition of system operation upon the breaking of a pair of contacts and does not depend upon the making of an opposite contact to complete the system condition changeover.

In one embodiment of the invention the system will operate only in a speed warning mode of operation until a positive lock-up action is taken by the vehicle operator to change the system operation to a speed maintaining condition. The speed maintaining condition may not be obtained until the vehicle has been manually accelerated through the usual accelerator pedal and associated linkage until it closely approaches the desired set speed. After the vehicle has entered a relatively narrow speed error sensing range the system may then be conditioned to maintain a constant vehicle speed. The system also includes means for deactivating the speed maintaining condition of operation and returning the vehicle to full manual control by the vehicle operator.

In another embodiment of the invention the system also provides a power throttle return so that when the speed maintaining condition is interrupted the engine throttle valve is urged toward zero throttle under servo power in addition to the force of the usual throttle return spring.

In another embodiment of the invention the vehicle may be accelerated by use of the system under manual control of the vehicle operator with the system shifting to the speed maintaining condition of operation upon substantial attainment of the desired set speed by the vehicle.

In the drawings:

FIGURE 2 is a schematic diagram of a modification of a portion of the system of FIGURE 1 which coupled with the unmodified portion of the system of FIGURE 1 results in a modified system embodying the invention.

FIGURE 3 is a schematic diagram of another modification of a portion of the system of FIGURE 1 which coupled with the unmodified portion of the system of FIGURE 1 results in a modified system embodying the invention.

Figure 1:
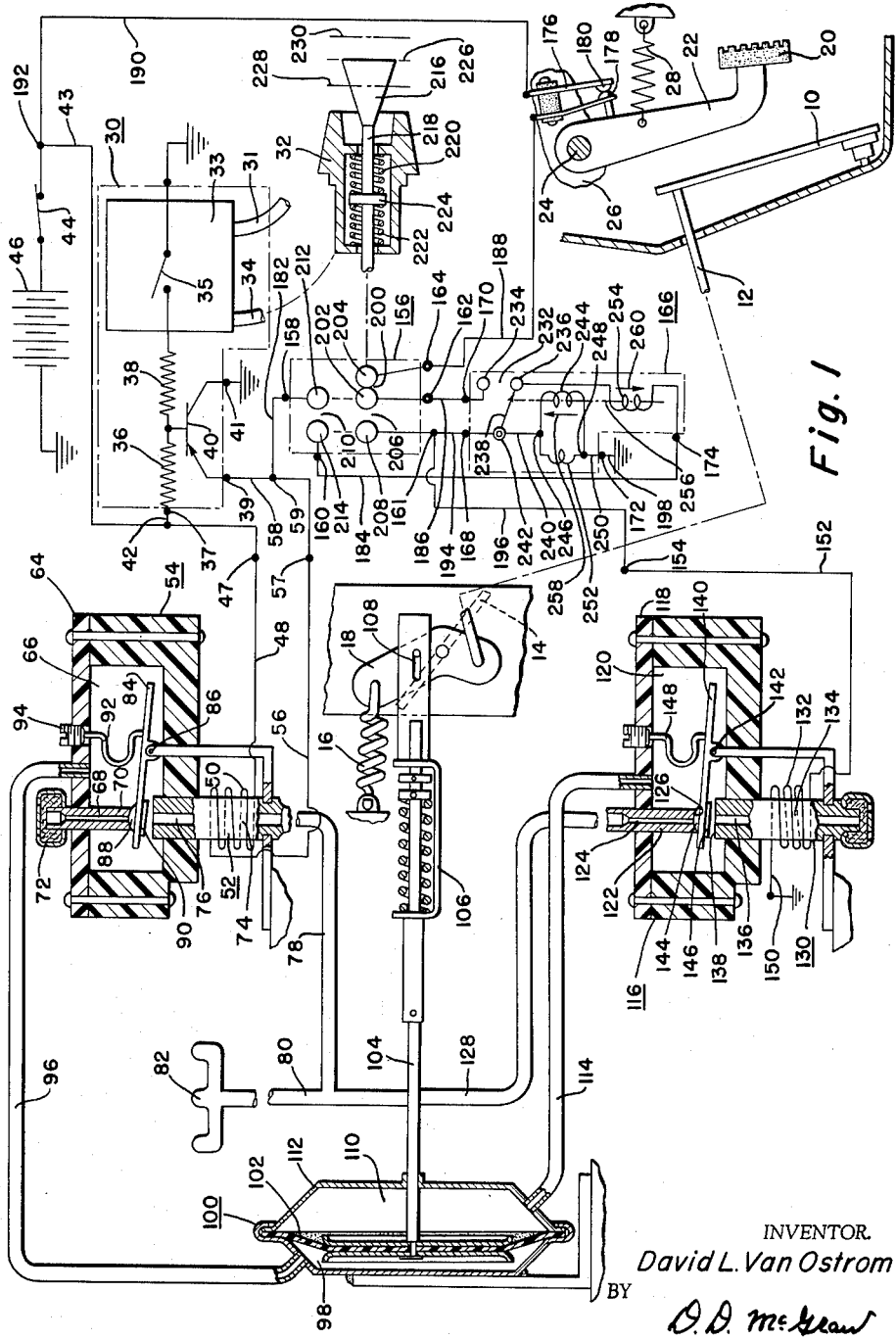
FIGURE 1 is a schematic diagram illustrating a system embodying the invention and having parts thereof broken away and in section.

The vehicle in which the system of FIGURE 1 is installed includes the accelerator pedal 10 connected to a throttle rod 12 for control of the engine throttle valve 14 in the usual manner. A throttle return spring 16 is suitably attached to the throttle linkage, of which arm 18 and rod 12 are parts, and urges the throttle valve 14 toward the zero throttle or engine idle position. Arm 18 is attached to the throttle valve so that it moves that valve under influence of spring 16 and rod 12. The vehicle also includes a brake actuating pedal 20 mounted on the brake pedal arm 22. This arm is suitably pivoted at 24 to the vehicle body 26. The usual brake pedal return spring 28 urges the pedal arm 22 to the brake release position.

The speed transducer 30 senses vehicle speed through the speedometer cable drive 31 and may be set at any desired vehicle speed for either the speed warning or the speed controlling mode of operation by the speed set knob 32 acting through the speed set drive cable 34. Details of the speed transducer 30 are disclosed in co-pending application Serial No. 67,820, entitled "Vehicle Speed Warning and Cruise Control System" and filed November 7, 1960, now Patent No. 3,088,538, and Serial No. 137,423, entitled "Vehicle Speed Warning and Cruise Control System," filed September 11, 1961, now Patent No. 3,087,340. Reference is therefore made to these patents for details of construction and operation of the speed transducer and the disclosures therein relative to the speed transducers are incorporated herein by reference. The transducer 30 includes a speed error sensing and signal generating section 33, with contacts providing a switch 35, resistors 36 and 38 connected to transistor 40, and connectors 37, 39 and 41. Connector 37 permits the connection of electrical lead 42 to electrical lead 43. Ignition switch 44 and a suitable source of electrical energy, schematically illustrated as a battery 46, are connected in series to lead 43. Lead 43 is provided with a connector 47 to which is connected the electrical lead 48. Lead 48 is also connected to one side of a coil 50 of the electromagnet assembly 52 which forms a part of the proportional control fluid pressure generating mechanism 54. The other end of coil 50 is connected through electrical lead 56 and connector 57 to electrical lead 58 containing connectors 59 and 39. Thus lead 56 from coil 50 is connected to the transistor 40. This portion of the system and the manner of operation wherein a speed error signal is developed and impressed on coil 50 are described in greater detail in the above noted patents. It is considered sufficient for the purpose of description of the invention claimed herein to state that the speed error signal is generated within a constant vehicle speed range containing the set speed and is in proportion to the amount of error found by comparing the actual vehicle speed with the desired vehicle speed. The characteristics of the signal put out by speed transducer 30 also indicate whether the actual vehicle speed is above or below the set speed.

The mechanism 54 includes a housing 64 having a pressure chamber 66 formed therein. A passage 68 is formed in a suitable conduit 70 extending into the chamber 66 and has a filtered inlet 72 so that air at atmospheric pressure is in passage 68 at all times. The core 74 of the electromagnet assembly 52 is constructed as a conduit having a passage 76 connecting with chamber 66. The passage 76 is connected through a fluid pressure conduit 78 to the fluid pressure conduit 80 which in turn is connected to a suitable source of reduced pressure such as the vehicle engine intake manifold 82. Thus intake manifold vacuum is present in passage 76 at all times when the vehicle engine is running.

A valve unit 84 is pivotally mounted at 86 within chamber 66. One end of the valve unit is provided with a valve having oppositely disposed valve faces 88 and 90 so that when valve face 88 is engaged with conduit 70 to close passage 68 no atmospheric pressure can enter chamber 66. At the same time that passage 68 is closed, valve face 90 is open relative to passage 76 so that intake manifold vacuum is applied to chamber 66. When valve face 90 is moved by pivotal movement of valve unit 84 to close passage 76, valve face 88 opens passage 68. In this condition engine intake manifold vacuum is sealed from chamber 66 and atmospheric pressure is admitted to it. A spring 92 is provided to engage valve unit 84 and urge the valve unit to the position wherein valve face 88 closes passage 68. A suitable spring adjuster 94 is also provided. The end of valve unit 84 containing the valve faces 88 and 90 is made of a magnetic material so that it acts as an armature and is magnetically attracted by core 74 of the electromagnetic assembly 52 when the coil 50 is electrically energized. Core 74 is normally continually energized when the vehicle is below the speed error sensing range in which the desired set speed is contained. The speed error signal from the speed transducer 30 is provided as a cyclic interruption of the electrical current passing through coil 50 so that there is little interruption time in each cycle when there is a speed error at the low end of the constant range of speed error indication. This results from the cyclic opening and closing of switch 35 when the vehicle speed is in the speed error sensing range, as more fully explained in the above noted patents. As the actual vehicle speed increases and approaches the set speed the cyclic interruption time is increased. The speed error signal which indicates a zero speed error may be characterized by a cyclic interruption time of the same duration as the cyclic closed time. Speed errors above the set speed within the speed error sensing range are indicated by a greater cyclic interruption time in relation to the cyclic closed time, with the cyclic interruption time increments increasing in relation to the amount of speed error above the set speed. Should the actual vehicle speed pass out of the speed error indicating range, the speed error signal would be a continual interruption so that coil 50 would be completely deenergized.

When coil 50 is first deenergized, indicating initial attainment of a vehicle speed within the speed error sensing range, valve unit 84 pivots in a direction tending to close passage 68 with face 88 and slightly opens valve face 90 relative to passage 76. The cyclic energization and deenergization of coil 50 continues to cause oscillative movements of valve unit 84 in timed relation to the energized and deenergized periods so that a proportional control pressure is developed in chamber 66 having limits of atmospheric pressure and engine intake manifold pressure. This pressure is communicated through conduit 96 to the speed warning chamber 98 of the power servo 100. The pressure in chamber 98 acts on the servo diaphragm 102 and becomes sufficient at the desired set speed to urge the servo rod 104 to the left as seen in the drawing. This force is transmitted through the lost motion mechanism 106 and the slot and pin connection 108 to arm 18, tending to close throttle valve 14 and exerting a force on the accelerator pedal 10 through rod 12 which is felt as a pedal back pressure by the vehicle operator. This force warns the operator that he has attained the set speed. If he desires, he may continue to accelerate the vehicle above this speed and the lost motion mechanism 106 will permit this action. The proportional control pressure in chamber 66, conduit 96 and chamber 98 will continue to approach the engine intake manifold pressure, in accordance with the amount of speed error, thus exerting a greater speed warning force against the operator's foot through the accelerator pedal 10 until the vehicle speed has passed through the speed error signal generating range. Thereafter, the force will be substantially constant since only engine intake manifold vacuum will be present in chamber 66, conduit 96 and chamber 98. If the operator desires to maintain the set speed by manual control of the pedal, he may merely ride the back pressure against the pedal.

Servo 100 also includes a speed control chamber 110 in the housing 112 to which is attached the fluid pressure conduit 114. A mode control assembly 116, which is generally similar in construction to the proportional control fluid pressure generating mechanism 54, has a housing 118 in which pressure chamber 120 is formed and to which conduit 114 is connected. A conduit 122 also extends into chamber 120 and is provided with a passage 124 terminating in chamber 120 at a valve seat 126. Conduit 122 is connected through conduit 128 to the engine intake manifold conduit 80. An electromagnet assembly 130 includes a coil 132 about a core 134 which has a passage 136 formed therethrough and extends through housing 118 into chamber 120, terminating in a valve seat 138 positioned opposite valve seat 126. The valve unit 140 is pivotally mounted at 142 within chamber 120 and is provided at one end with a valve having oppositely extending valve faces 144 and 146. Valve face 144 is arranged for seating engagement with valve seat 126 and valve face 146 is arranged for seating engagement with valve seat 138, depending upon the pivoted position of valve unit 140. A spring 148 urges valve unit 140 in the position shown in the drawing where valve face 146 closes passage 124 and valve face 146 is removed from seat 138 so that passage 136 is connected with chamber 120. One end of coil 132 is connected through electrical lead 150 to ground and the other coil end is connected through electrical lead 152 to connector 154.

A switch assembly 156 is provided with five electrical connectors 158, 160, 161, 162 and 164, with connectors 162 and 164 being schematically illustrated as switch contact support pivots in addition to being electrical connectors. A relay assembly 166 is also provided and includes connectors 168, 170, 172 and 174. A brake actuated release switch 176 is also provided and arranged so that its contacts 178 and 180 are held closed by the brake pedal arm 22 so long as the pedal arm is in its brake released position. When the operator moves the pedal arm 22 to actuate the brakes, contacts 178 and 180 open.

Switch assembly connector 158 is connected by electrical lead 182 to connector 59 in lead 58. Switch assembly connector 160 is connected by electrical lead 184 to the relay assembly connector 174. Switch assembly connector 162 is connected by electrical lead 186 to relay assembly connector 170. Switch assembly connector 164 is connected by electrical lead 188 to brake switch contact 178. Electrical lead 190 connects brake switch contact 180 through connector 192 to lead 43 which leads from the ignition switch 44. Switch assembly connector 161 is connected through electrical lead 194 to relay assembly connector 168 and also through electrical lead 196 to connector 154 of the mode control assembly 116. Connector 172 of relay assembly 166 is connected to ground through electrical lead 198.

The switch assembly 156 includes a normally closed switch 200 made up of contacts 202 and 204 which are respectively pivoted on and electrically connected to pivot connectors 162 and 164 in the schematic illustration. A normally open switch 206 includes pivotal contact 202 and contact 208, which is anchored and electrically connected to connector 161. A third switch 210, of the normally open type, includes contacts 212 and 214 which are respectively electrically connected to connectors 158 and 160, with contact 212 also being mechanically connected but electrically insulated from contact 202 so that pivotal movement of contact 202 results in concurrent pivotal movement of contact 212 about pivot connector 162. The mechanical connection between the contacts 202 and 212 is such that it permits switch 206 and switch 210 to close upon leftward pivotal movement of the contacts. A switch actuating knob 216 is mounted in speed set knob 32 on a push-pull rod 218 which is biased to a center position in knob 32 by opposed springs 220 and 222 acting on the spring seat 224 attached to the rod. Knob 216 extends outwardly beyond knob 32 and has three positions for controlling switch assembly 156. The center position illustrated is the normal position 226, wherein switch 200 is closed and switches 206 and 210 are open. When the knob 216 is pushed to the full engage position 228, against the force of spring 222, switches 206 and 210 are also closed. When the operator releases knob 216, springs 220 and 222 return it to the normal position 226. Knob 216 may also be moved to a full open position 230 against the force of spring 220 to open switch 200. Springs 220 and 222 again return the knob to the normal position 226 upon release.

The relay assembly 166 includes a switch 232 comprised of contacts 234 and 236 and a pivotal contact arm 238. Arm 238 is electrically conductive and is alternately engageable with one of the two contacts of switch 232. An electrical lead 240 interconnects the arm pivot 242 with connector 168 and extends beyond the pivot so that one end of relay coil 244 is electrically connected to it at 246. The other end of coil 244 is connected at 248 to electrical lead 250 which in turn is connected to connector 172 and then to ground through electrical lead 198. An indicating lamp 252 is connected at 246 and 248 so that it is in parallel with coil 244. A second relay coil 254 has one end connected to contact 236 and the other end connected to connector 174. A common core 256 extends through coils 244 and 254 and is mechanically connected with arm 238 so that movement of the core under influence of either one of the coils results in movement of arm 238. Coil 244 when energized urges core 256 upwardly in the direction of arrow 258 and coil 254 when energized urges core 256 downwardly in direction of arrow 260. Coils 244 and 254 are of equal strength so that core 256 does not move when both coils are energized.

When the vehicle is operating below the set speed, for example at 30 m.p.h. with a set speed of 60 m.p.h., the system is in a condition to provide a speed warning upon manual acceleration to 60 m.p.h. Thus the ignition switch 44 is closed as is the brake switch 176. Electrical energy is therefore supplied to contact 234 through switch 200 and switch 176 and to coil 50 through leads 43 and 48. Coil 50 is energized since it is connected to ground through leads 56 and 58, transistor 40 and connector 41. Coil 132 of the mode control assembly 116 is not energized since switches 206 and 210 are open. Thus the mode control assembly has its valve unit 140 so positioned that atmospheric pressure is in chamber 120. The proportional control fluid pressure generating mechanism 54 has atmospheric pressure in its chamber 66 since its valve unit 84 is held down by the magnetic force in core 74 to close off the passage 76 against the force of spring 92.

As the vehicle speed enters the speed error sensing range, which may for example be between 57 and 63 m.p.h. and therefore substantially centered on the desired set speed of 60 m.p.h., the opening of switch 35 in speed transducer 30 causes the transistor 40 to switch and momentarily interrupt the circuit energizing coil 50. These interruptions are cyclic and increase with an increase in vehicle speed so that the valve unit 84 acts to proportion intake manifold vacuum and atomspheric air into chamber 66 to establish the speed error proportional control pressure therein. This pressure is transmitted to speed warning chamber 98 of the servo 100 and exerts the speed warning force on the throttle linkage which is felt by the operator through the accelerator pedal 10. Unless the operator changes the system condition by movement of knob 216, the system will continue to operate in the speed warning condition. However, if the operator desires to shift the system to the speed maintaining mode of operation, he presses knob 216 momentarily to move it to the full engage position 228. This simultaneously closes switches 206 and 210. Voltage is then applied to both of the relay coils 244 and 254 as well as the indicating lamp 252, energizing the control system. If the switch 35 in the speed error sensing and signal generating section 33 of the speed transducer 30 is closed when switches 206 and 210 are closed, coils 244 and 254 of the relay assembly 166 will both be energized. Since the coils are fixed in opposition, relay contacts 234 and 236 and arm 238 remain in the normal position. However, the moment the speed transducer switch 35 opens coil 254 it is deenergized and coil 244 moves core 256 and arm 238 upwardly to open contact 236 and then connect arm 238 with contact 234. The opening of contact 236 immediately prevents coil 254 from becoming reenergized without requiring arm 238 to complete its movement to make contact 234. A holding circuit is thus energized for coil 244. The knob 216 may then be released to its normal position 226 and the control system will remain energized. Since a momentary opening of the transducer switch 35 is required for the relay assembly 166 to establish the holding circuit, the control system cannot be locked into operation until the vehicle speed exceeds the lower limit of speed error sensing range.

The closing of switch 206 causes coil 132 of assembly 116 to be energized and to hold it energized so that the valve unit 140 is attracted downwardly against spring 148 to cause the atmospheric passage 136 to be closed and to open the vacuum passage 124 to chamber 120. Vacuum is thus transmitted through conduit 114 to the speed control chamber 110 of the servo 100. The system then operates in the speed maintaining mode of operation.

The speed maintaining and cruise control mode of operation is discontinued by interrupting the voltage supply to the entire system. This is accomplished by either depressing the brake pedal to open switch 176 or by moving knob 216 to the full open position 230 to open switch 200. This immediately deenergizes the mode control assembly 116, causing atmospheric pressure to enter chamber 110, and releases the hold effect of coil 244 on relay switch 232 so that the relay is reset with arm 238 again contacting contact 236. The operation of the relay assembly 166 is very fast since both the speed maintaining lock-in and the reseting functions require only the breaking of a closed contact to assure successful operation. Thus the release switching time is only the time to break contact rather than to make the opposite contact.

FIGURES 2 and 3 show modifications of the system of FIGURE 1 to provide different system operating characteristics. Only portions of the electrical system are shown and the modified systems may be connected to the fluid system of FIGURE 1 at connectors 47, 57 and 154.

FIGURE 2 shows the electrical modifications necessary to place the coil 50 in series with the ignition switch 44 and the brake actuated switch 176. This is accomplished by disconnecting electrical lead 43 of FIGURE 1 from connector 192 and connecting it to a connector 262 which is provided in electrical lead 188. This provides a power throttle return when the brakes are depressed to open switch 176. The entire electrical system is deenergized when switch 176 is opened so that the control mechanism 54 ports full engine intake manifold vacuum into speed warning chamber 98 while assembly 116 connects atmospheric pressure to chamber 110. This immediately causes servo 100 to move throttle valve 14 to the zero throttle position and to hold the throttle in this position so long as brake switch 176 is open. When the brake pedal is released and switch 176 is again closed, coil 50 of mechanism 54 is again energized to hold valve face 90 against core 74 to maintain passage 76 closed so that only atmospheric pressure is applied to speed warning chamber 98.

FIGURE 3 illustrates another modification of the system wherein the normally closed switch 200 of switch assembly 156 is in series with coil 50, brake switch 176 and ignition switch 44. This adds to the power throttle return function to the system when the engage knob 216 is pulled out to the full open position 230 to open switch 200. In this instance lead 43 is disconnected from connector 192 and connected to the connector 264 provided on relay assembly 166. Relay contact 234 is electrically connected to connector 264. Thus the power throttle return feature is obtained when either the switch 200 or the switch 176 is opened.

The power throttle return feature has some advantages which include the provision of a quick release from the cruise control mode of operation, eliminating the tendency for the engine to oppose quick vehicle stops. It also discourages the operator from driving with one foot on the brake pedal, an all too common habit which is not the best practice when operating a motor vehicle.

Figure 4:
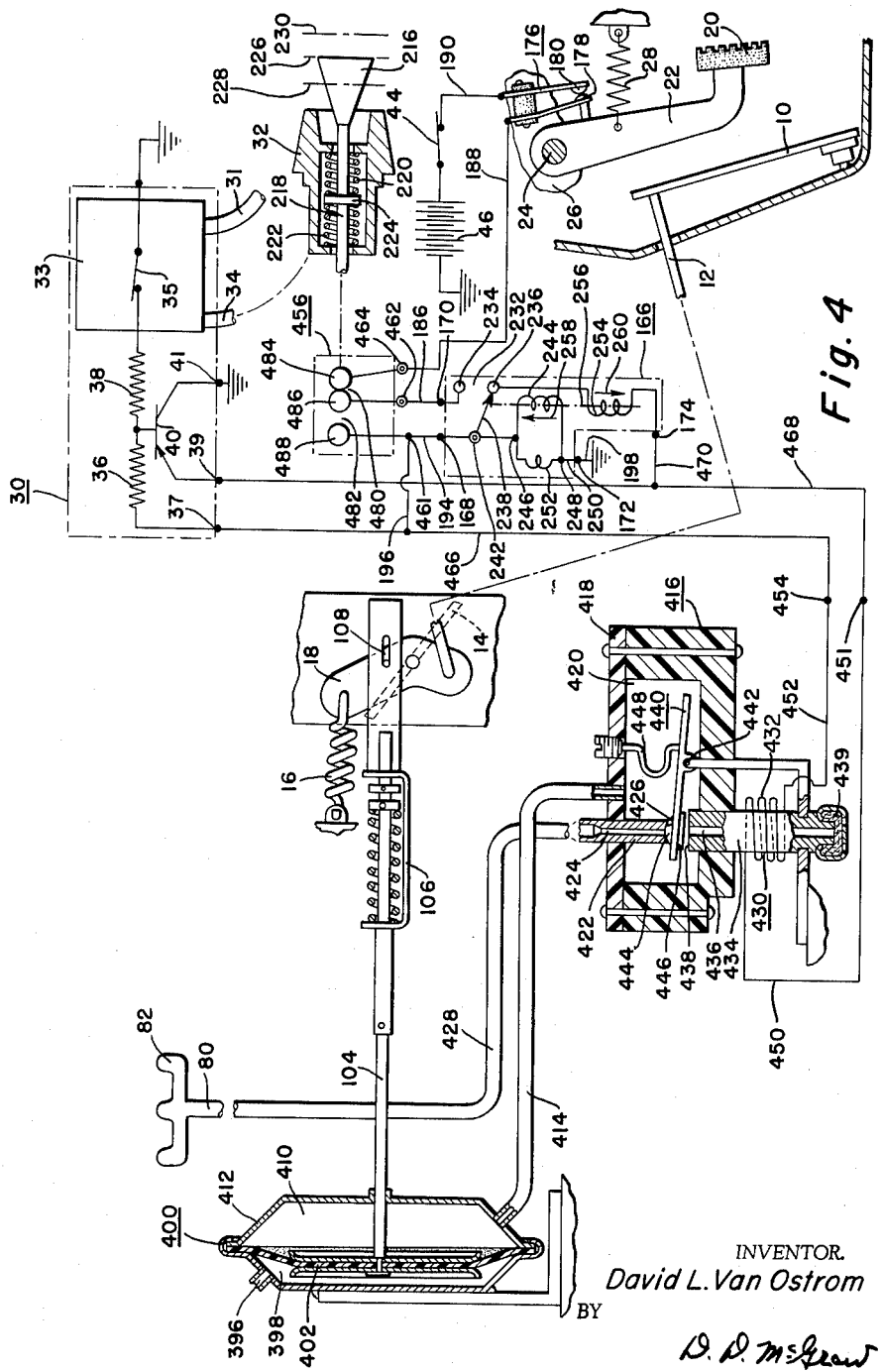
FIGURE 4 is a schematic diagram of another modification of the system by which no speed warning mode operation is provided. Elements of the system are illustrated with parts broken away and in section.

FIGURE 4 schematically illustrates a further modification of the system of FIGURE 1 wherein the speed maintaining feature is retained without the speed warning feature. The electrical inhibiting and cruise control engaging system is utilized as before. The system of FIGURE 4 includes the speed transducer 30 which is identical to the speed transducer assembly of FIGURE 1. It also includes the same throttle control linkage from the accelerator pedal 10 through the arm 18 and the same servo rod 104 with the same lost motion mechanism 106. The speed set knob 32 and the assembly of which it is a part is the same as that shown in FIGURE 1. The brake system, including switch 176, is also the same as that shown in FIGURE 1. The relay assembly 166 is likewise the same as that used in the system of FIGURE 1. These assemblies and other elements which are identical to elements in FIGURE 1 are identified with the same reference numerals used with regard to that figure.

The servo 400 of FIGURE 4 is physically constructed in the same manner as the servo 100 of FIGURE 1 but due to the connections thereto certain portions of the servo have different functions. Servo 400 includes a housing 412 in which the diaphragm 402 is mounted to divide the housing into an atmospheric chamber 398, but having an atmospheric inlet 396, and a speed control chamber 410. A conduit 414 is connected with chamber 410 of the servo and also with chamber 420 formed in the housing 418 of the proportional control fluid pressure generating mechanism 416. Mechanism 416 is constructed in the same manner as is the mode control assembly 116 of FIGURE 1 but due to the electrical connections therewith performs the same function as does the mechanism 54 of FIGURE 1. Conduit 422 extends into chamber 420 of housing 418 and is provided with a passage 424 terminating in chamber 420 at valve seat 426. Conduit 428 is connected to the engine intake manifold 82 through the conduit 80. The electromagnet assembly 430 includes coil 432 about a core 434 which extends through housing 418 and terminates with a valve seat 438. A passage 436 through core 434 is connected with chamber 420 at valve seat 438 and to the atmosphere through the filtered inlet 439.

A valve unit 440 is pivotally mounted at 442 in chamber 420 and is provided with a valve having valve faces 444 and 446 extending on opposite sides thereof and in engaging alignment with valve seats 426 and 438, respectively. A spring 448 engages valve unit 440 and urges valve face 444 into sealing engagement with valve seat 426 to close passage 424. One end of coil 432 is connected through electrical lead 450 to connector 451. The other end of coil 432 is connected through electrical lead 452 to connector 454. Electrical lead 466 connects connector 454 with lead 196 and the speed transducer connector 37. Electrical lead 468 connects connector 451 with the speed transducer connector 39 and the electrical lead 470. Connector 174 of the relay assembly 166 is connected to lead 470.

A simplified switch assembly 456 is provided in place of the switch assembly 156 of FIGURE 1. The switch assembly includes the connectors 461, 462 and 464, with the latter two connectors being pivoting connectors. The assembly 456 is provided with a normally closed switch 480 and a normally open switch 482. Switch 480 includes contact 484, which is pivotally connected to connector 464, and contact 486, which is pivotally connected to connector 462. Switch 482 includes contact 486 and contact 488, with the latter contact being electrically connected to connector 461. The rod 218 is mechanically connected to contact 484 so that movement of the knob 216 from the normal position 226 to the engage position 228 will close switch 482. Release of knob 216 by the operator will permit the springs 220 and 222 to return the knob to the normal position 226 and open switch 482. Movement of knob 216 to the open position 230 to open switch 480 and release of the knob will again permit the knob to return to the normal position 226 in which switch 480 is closed.

Switch assembly 456 is connected to relay assembly 166 in a similar manner to that of switch assembly 156 of FIGURE 1. Thus connector 461 is connected through electrical lead 194 to connector 168 and connector 462 is connected through electrical lead 186 to connector 170. Connector 464 is connected into electrical lead 188 to contact 178 of the brake switch 176.

As disclosed in the above noted patents and as in the other modifications disclosed herein, the speed transducer 30 has its switch 35 closed when the vehicle is below the speed error sensing range. However, coil 432 is deenergized in the system of FIGURE 4 until the vehicle reaches the speed error sensing range and the operator moves knob 216 to close switch 482 since the energization of the speed transducer 30 must be accomplished either through switch 482 or the holding relay switch 232.

The condition of operation illustrated in FIGURE 4 is that wherein the vehicle is below the speed error sensing range. When the operator moves knob 216 to the position 228, he closes switch 482. This immediately energizes coil 432 so long as the speed transducer switch 35 is closed. At the same time both relay coils 244 and 254 are energized and relay arm 238 remains in contact with contact 236. When the speed transducer switch 35 opens for the first time after the closure of switch 482, relay coil 254 is deenergized and arm 238 is moved upwardly to break with contact 236 and to engage contact 234, thus establishing the holding circuit for relay coil 244 which bypasses switch 482. The operator can then release knob 216 and it will return to the normal position 226. Coil 432 will then be cyclically energized and deenergized in accordance with the cyclic operation of the speed transducer. The electrical signal controlling coil 432 reflects the extent of the speed error and indicates whether the speed error is above or below the set speed, as more fully described above and in the above noted applications. Mechanism 416 thus generates a fluid pressure responsive to the speed error signal which has limits of atmospheric pressure and intake manifold vacuum, and is impressed on diaphragm 402 since it is present in chamber 410. The difference in pressures in chamber 398 and 410 causes movement of the diaphragm 402 to control movement of the throttle valve 14 and therefore maintain the vehicle speed at the set speed.

The vehicle operator may disengage the speed maintaining control operation of the system in either of two ways. He may pull knob 216 out to position 230 to open switch 480, or he may actuate the brake pedal 20 to open switch 176. Since these switches are in series in the electrical power supply circuit, the opening of either switch will cause the entire system to be deenergized. Relay mechanism 166 will have its coil 244 deenergized and the relay will act to return arm 238 into engagement with contact 236, the holding circuit having been broken when the arm disengages itself from contact 234. The inhibiting function of the system is then set up as before and the system cannot return to the speed control mode of operation until the operator again closes switch 482 and switch 35 opens in its speed error sensing and generating function.

The operator may manually hold the system in a speed control operation when the vehicle is below the set speed by holding knob 216 in position 228 to hold switch 482 closed. Since the speed transducer contacts at this time will be closed at all times, coil 432 will be energized at all times, thus holding valve unit 440 in position to admit only intake manifold vacuum to chamber 420 of mechanism 416 and therefore to chamber 410 of the servo 400. This will cause diaphragm 402 to move to the right, opening the throttle valve, and thus causing the vehicle to accelerate. The acceleration will continue so long as switch 482 is manually held closed or until the speed transducer contacts commence cyclic interruption of the power supply to core 432 by reason of the vehicle having entered the vehicle speed error sensing range. The system will then act as before to maintain the vehicle at the set speed.

The advantages of the system of FIGURE 4 include an electrical inhibitor action which prevents the system from being accidentally engaged when the vehicle is traveling below the speed error sensing range. The manual hold-in feature allows the driver to override the inhibitor by keeping the engage knob depressed. The manual release feature allows the driver to release the system by hand when he momentarily pulls out the engage knob. The brake release feature assures fast, positive disengagement of the system upon depression of the brake pedal. Each change in condition of the system is accomplished by opening contacts and does not require additional time to make the opposite contact.

What is claimed is:

1. A control system for regulating the speed of a motor vehicle to maintain it substantially constant, said system comprising: fuel control means for the motor vehicle engine, mult-terminal electrically energizable and deenergizable first control means for controlling the operation of said fuel control means to operatively control the vehicle speed, vehicle speed responsive switching means operable between opened and closed position in accordance with actual vehicle speed error from a desired vehicle speed, a source of direct current, a normally closed manually operable first switch having one contact connected to one side of said source of direct current, a manually operable normally open second switch which is capable of being momentarily closed, second control means having first, second, third and fourth terminals, said second control means being so constructed and arranged that said first and fourth terminals are electrically connected when current is passing between said first and second terminals and between said first and fourth terminals, said second control means being operative to electrically connect said first and third terminals when current is passing only between said first and second terminals, means electrically connecting one terminal of said first control means and the first terminal of said second control means with one of the contacts of said second switch, means connecting the third terminal of said second control means with one of the contacts of said first switch, means connecting another terminal of said first control means and said fourth terminal of said second control means with one side of said speed responsive switching means, and means connecting the opposite side of said speed responsive switching means and said second terminal of said second control means with the other side of said source of direct current, said speed responsive switching means and said second control means thereby being operative to control the electrical energization and deenergization of said first control means.

2. The control system of claim 1, said second control means comprising two coils the fluxes of which are substantially equal and in opposition, one of said coils being connected to said first terminal and said second terminal and the other of said coils having one side connected to said fourth terminal and the other side connected to said first terminal when current is passing between said first and fourth terminals.

3. A vehicle speed maintaining control system for selectively maintaining a constant vehicle speed under varying road load conditions and comprising: a throttle valve for controlling the vehicle engine, a servomotor selectively operable to control the throttle valve to maintain the vehicle speed constant under varying load conditions, control means for said servo having a first section with two terminals and a second section with two terminals and being electrically energizable and deenergizable to control said servo, a speed transducer having two terminals respectively connected with the two terminals of said control means first section and producing a speed error signal within a constant range of vehicle speed electrically energizing and deenergizing said control means first section, a source of direct current; a switch assembly having a normally closed manually operable first switch having one contact connected to one side of said source of direct current and a manually operable normally open second switch which is capable of being momentarily closed; a relay assembly having two opposite equal flux coils therein and first, second, third and fourth terminals, with one of said coils being connected to said first and second terminals and the other of said coils being connected to said fourth terminal and to said first terminal when current is passing between said first and fourth terminals; said relay assembly being operative to electrically connect said first and third terminals when current is passing only between said first and second terminals through said one coil, means electrically connecting one terminal of said control means second section and the first terminal of said relay assembly with one contact of said second switch, means connecting one terminal of said control means first section and said fourth terminal of said relay assembly with one side of said speed transducer, means connecting the third terminal of said relay assembly with one of the contacts of said first switch, and means connecting the opposite side of said speed transducer and said relay assembly second terminal with the other side of said source of direct current.

4. In a vehicle road speed control system having an engine throttle control including, a manually operated throttle linkage, a power servo connected therewith for selectively operating the same, a speed transducer having a selective desired vehicle speed input and an actual vehicle speed input and an electrical speed error signal output, means receiving said speed error signal output for controlling the application of power to said servo in accordance with said speed error signal means providing a reference signal, and means selectively delivering said reference signal to said receiving means in opposition to said speed error signal output; the improvement comprising, a switch assembly including a manually operable switch having normally closed first and second contacts and normally open third and fourth contacts with said second and third contacts being electrically connected, a source of electrical energy electrically connected to said first contact and to ground, a second switch assembly having an opposed flux two coil operating relay and a fifth contact electrically connected to said second and third contacts and a sixth contact electrically connected to one side of one coil of said relay and a relay actuated switch arm electrically connected to said fourth contact and to one side of the other coil of said relay, said switch arm electrically engaging said sixth contact when said third and fourth contacts are open and engaging said fifth contact when said third and fourth contacts are closed and said speed transducer is generating a speed error sensing signal and remaining in engagement with said fifth contact so long as said source of electrical energy is connected to said first contact and said first and second contacts remain closed, said fourth contact being connected to said reference signal selective delivering means to cause the same to deliver said reference signal as aforesaid when and so long as said fourth contact is electrically energized.

5. A vehicle road speed maintaining system comprising, means for generating a vehicle speed error signal and including a normally closed switch sensitive to actual vehicle speed and a desired vehicle speed to cyclically open to indicate speed error direction and magnitude within a vehicle speed error sensing range and to remain respectively closed and open when the actual vehicle speed is below and above said range, power servo means for controlling actual vehicle speed in operative response to said speed error signal, a source of servo power, control means receiving said speed error signal and controlling the delivery of power from said source to said servo in accordance with said speed error signal, and means for activating and deactivating said control means and including manually operable normally open switch means and holding relay operated switch means electrically connected in parallel to said control means and a relay for operating said holding relay operated switch means and actuated to close the same only when said manually operable normally open switch means is closed and said speed error signal generating normally closed switch is open.

6. A vehicle road speed maintaining system comprising, speed error signal generating means having a normally closed first switch cyclically openable and closeable within a speed error sensing range to generate a speed error signal, a source of pressure different from atmospheric pressure, a pressure operated servo for controlling the vehicle speed when energized, servo energizing means receiving said speed error signal and pressure from said source and delivering a proportional control pressure to said servo in accordance with said speed error signal, a source of electrical energy having one side connected with one contact of said first switch, a manually operated normally open second switch having one contact connected with the other side of said electrical energy source and the other contact connected with said servo energizing means to render said servo energizing means responsive to said speed error signal, a relay-closed normally open third switch connected in parallel with said second switch, and a relay responsive to closing of said second switch and opening of said first switch to hold said third switch closed independently of further closing and opening of said first and second switches to maintain said servo energizing means responsive to said speed error signal.

7. A vehicle road speed maintaining system comprising, means for generating a speed error signal indicative of speed error direction and magnitude within a constant range of vehicle speed including a desired vehicle speed and including a first normally closed switch arranged to remain closed when the actual vehicle speed is below said range and to remain open when the actual vehicle speed is above said range and to cyclically open and close when the actual vehicle speed is within said range to generate said signal, a power servo for controlling vehicle speed in operative response to said speed error signal to maintain the actual vehicle speed substantially equal to the desired vehicle speed, a source of servo power, control means receiving servo power from said source and said signal from said generating means and delivering power to said servo modified in response to said speed error signal, second and third parallel connected switches for controlling delivery of said speed error signal to said control means when either of said second and third switches is closed, and means responsive to the closing of said second switch and one opening cycle of said first switch to close said third switch and to hold said third switch closed independently of later opening and closing of said first and second switches, a source of electrical power for said generating means, and a fourth switch for interrupting the supply of electrical power.

8. A vehicle speed maintaining system comprising, a differential pressure actuated servo having a housing and a power wall therein dividing said housing into first and second chambers, means for connecting said power wall to the vehicle engine throttle, a source of fluid pressure different from atmosphere, control means connected with said pressure source and atmosphere and said servo for establishing a first pressure in said first chamber having pressure limits established by pressure from said source and atmospheric pressure and acting on said power wall to decrease vehicle speed and to establish a second pressure different from atmospheric pressure in said second chamber acting on said wall to increase vehicle speed, means responsive to vehicle speed and a desired set speed for proportioning pressure from said source and atmospheric pressure to control said first pressure in accordance with vehicle speed error, and means for connecting said second chamber only to atmospheric pressure while maintaining said first pressure in said first chamber independently of said pressure proportioning speed responsive means to provide a fluid pressure actuated power engine throttle return.

9. In a vehicle speed maintaining system having a servo subject to differential pressures for opening and closing the vehicle throttle in accordance with a speed error signal to establish a speed maintaining condition, means for interrupting control of said servo to open the engine throttle and maintaining the one differential pressure acting on the servo to close the vehicle throttle to disestablish the speed maintaining condition and provide a pressure actuated power throttle return independently of the speed error signal.

References Cited by the Examiner

UNITED STATES PATENTS 2,916,100  12/59  Teetor _____ 180—82.1

A. HARRY LEVY, *Primary Examiner.*